United States Patent [19]

Young

[11] Patent Number: 5,075,976

[45] Date of Patent: Dec. 31, 1991

[54] POWER TOOL GUARD RETAINER

[76] Inventor: Peter W. Young, 1270 Cedar Dr., Southold, N.Y. 11971

[21] Appl. No.: 650,849

[22] Filed: Feb. 5, 1991

[51] Int. Cl.[5] .................... B23D 45/16; B23D 47/00

[52] U.S. Cl. .................... 30/391; 83/860

[58] Field of Search .................... 30/391, 390; 83/860, 83/DIG. 1

[56] References Cited

U.S. PATENT DOCUMENTS

| | | | |
|---|---|---|---|
| 1,102,018 | 6/1912 | Dodds | 30/373 |
| 1,270,430 | 9/1916 | Martin | 30/391 |
| 1,644,326 | 4/1925 | Crowe | 30/391 |
| 1,738,896 | 7/1929 | Hansen | 30/391 |
| 1,740,074 | 12/1929 | Crowe | 30/391 |
| 1,900,553 | 3/1933 | Hampton | 30/391 |
| 2,544,461 | 3/1951 | Leitzel | 30/391 |
| 2,722,746 | 11/1955 | Brenner | 30/391 |
| 2,737,985 | 3/1956 | Utz | 30/391 |
| 2,861,607 | 10/1958 | Emmons | 30/391 |
| 2,916,062 | 9/1959 | Clauson | 30/391 |
| 2,926,709 | 3/1957 | Kaley | 30/391 |
| 2,955,629 | 3/1960 | Bork | 30/391 |
| 2,963,056 | 12/1960 | Rickford | 30/391 |
| 3,063,481 | 11/1962 | Sutherland | 30/391 |
| 3,177,909 | 4/1965 | Laube et al. | 30/391 |
| 3,410,325 | 11/1968 | Winther | 30/391 |
| 3,441,067 | 4/1969 | Forcier | 30/391 |
| 3,613,748 | 10/1971 | DePue | 30/391 |
| 3,730,239 | 12/1971 | Kaman et al. | 30/391 |
| 3,787,973 | 1/1974 | Beisch et al. | 30/391 |
| 3,805,639 | 4/1974 | Peter | 30/391 |
| 4,685,214 | 8/1987 | Shearon et al. | 30/391 |

*Primary Examiner*—Frank T. Yost
*Assistant Examiner*—Kenneth E. Peterson
*Attorney, Agent, or Firm*—Allegretti & Witcoff, Ltd.

[57] ABSTRACT

A hand held power tool, such as a circular saw, having a saw blade, grinding wheel or other tool disc and having a moveable guard member protectively covering a portion of the working surface of the tool disc, is provided with a guard retainer. The guard retainer comprises a retaining latch mounted to the tool for movement to a latching position to releasably hold the moveable guard member in a retracted position during operation of the power tool. Latch operating means are operably linked to the retaining latch to hold the retaining latch in the latching position against a biasing force. In the latching position a surface of the retaining latch engages a latch stop of the moveable guard member.

16 Claims, 3 Drawing Sheets

POWER TOOL GUARD RETAINER

FIELD OF THE INVENTION

The present invention relates to a power tool guard retainer mechanism, and more particularly relates to a retainer mechanism to hold a movable guard in an open position during operation of the power tool.

BACKGROUND OF THE INVENTION

Hand held power tools, such as circular saws, grinders and the like, in which the blade or other cutting tool is protected by a spring biased, movable guard are well known in the art. Typically, the guard is designed to be moved to an open position by contact with a workpiece as the cutting blade is moved through the workpiece. In cutting very soft material, such as soft wood, the spring biased blade guard can scratch or otherwise mar the surface of the workpiece. In addition, it has long been a problem that in using such hand held power tools to cut a thin slice from a workpiece or to make a shallow angle cut, the guard typically does not engage the workpiece squarely or completely. This may cause the power tool to shift laterally during the cut, thereby rendering the cut imprecise and perhaps ruining the workpiece. Thin slices cut from a workpiece also may become jammed between the blade and the guard before the guard has moved sufficiently toward the open position.

In an attempt to overcome at least some of these problems, power tool operators frequently will use one hand to hold the movable guard in its open position. This leaves only one hand to hold and guide the power tool and no hand is left free to hold the workpiece.

Thus, employing one hand to hold the guard open reduces operator control of the cutting operation and reduces work quality and safety. Power tool operators also have been known to disable the guard, such as by jamming it permanently in its full open position, or even to remove the guard entirely. Disabling or removing the blade guard obviously presents a significant safety risk to the tool operator.

Attempts have been made to provide means for retaining a movable guard member in a retracted et al a circular saw is disclosed wherein a slidable pin is mounted on a movable saw blade guard member. To lock the movable guard member in its open position finger pressure is applied to the outer head of the slidable pin. The inner end of the pin registers with an opening in an upper, fixed portion of the guard. It is a disadvantage of this design that the operator does not fully control the release of the lower guard member. As noted in the patent, slight pressure against the end of the movable guard causes the slidable pin to be released from the opening in the fixed guard, allowing the movable guard to return to the closed position. It is another disadvantage that the operator must either cause pressure against the end of the movable guard or must manually manipulate the spring and lower guard member to release the movable guard to cause it to return to the closed, protecting position.

Another mechanism for retracting a movable lower guard of a portable saw is seen in U.S. Pat. No. 3,787,973 to Beisch et al. The manually operable retractor mechanism of Beisch et al is connected by direct linkage to the movable lower guard member. The mechanism locks the lower guard in the retracted position. Release of the lower guard member is not fully controlled by the tool operator, however, since, as in the Laube et al patent discussed above, pressure against the movable member (moving it further toward its open position) will automatically release it and allow it to return to its closed position.

It is an object of the present invention to provide a retainer mechanism for a movable tool guard. In particular, it is an object of the present invention to provide a retainer mechanism which in at least certain preferred embodiments overcomes some of the disadvantages inherent in devices previously known to the art. Additional objects and features of the invention will be better understood from the following disclosure.

SUMMARY OF THE INVENTION

The present invention is directed to hand held power tools, such as circular saws and the like. Specifically, the hand held power tools of the invention comprise a tool disk having a circular peripheral working surface, such as a saw blade or a grinding or sanding wheel. The tool disk is mounted for rotation in a plane, generally on the output shaft of an electric motor of the power tool. The power tool further comprises a tool guard having a movable member biased toward a closed position, that is, a position in which it covers a circumferential portion of the working surface of the tool disk. The guard member can be moved to an open position in which the working surface is exposed for contact with a workpiece, for example, a wooden workpiece to be cut. According to a significant aspect of the invention, the power tool further comprises a guard retainer. Specifically, a retaining latch is mounted to the tool for movement to a latching position to releasably engage a latch stop on the tool guard. The latch engages such latch stop when the movable guard member is in its open position and holds the tool guard in that position until released by the operator. Latch biasing means applies a biasing force to move the retaining latch out of the latching position. Latch operating means of the power tool, operably linked to the retaining latch, receives latching force applied by the tool operator to move the retaining latch to the latching position against the biasing force of the latch biasing means. The latch operating means then holds the retaining latch in the latching position against such biasing force as long as the operator continues to apply latching force to the latch operating means.

It is a significant advantage of the present invention that the release of the movable guard member is within the control of the tool operator. Specifically, the retaining latch remains in position engaging the latch stop of the movable guard member until released by the tool operator. The movable guard member is not released, therefore, to come into contact with (and possibly to scratch or otherwise damage) the surface of a workpiece except by action of the operator. Of course, as will be explained below, the guard retainer can be designed to automatically release the retaining latch if the power tool is released from the hands of the operator. Significantly, mere pressure against the leading edge of the movable guard member will not release the guard member to return to its closed position. Additional advantages and features of the invention will be more fully understood in view of the present disclosure, including the detailed description provided below of certain preferred embodiments.

BRIEF DESCRIPTION OF THE DRAWINGS

Certain preferred embodiments of the present invention discussed below are illustrated in the accompanying drawings in which.

DESCRIPTION OF PREFERRED EMBODIMENTS

Figure 1:
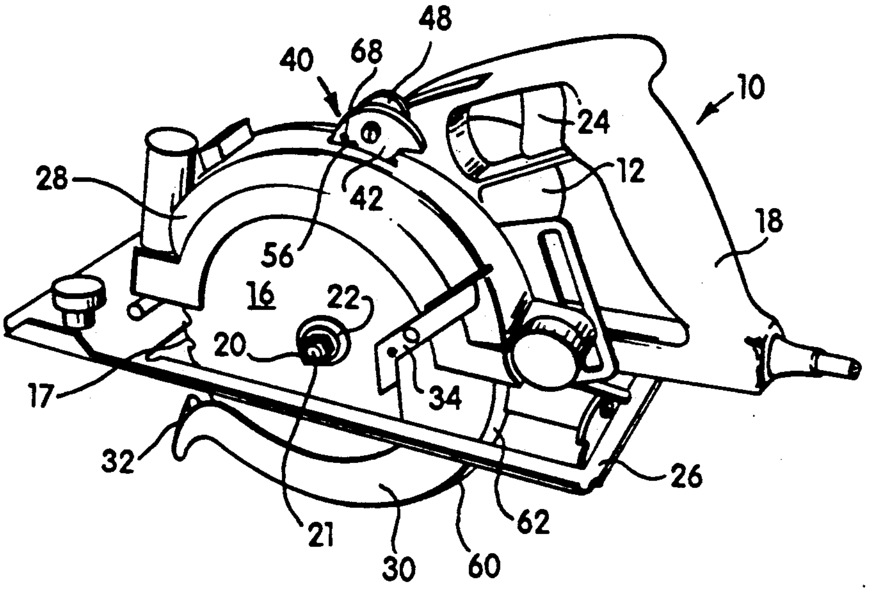
FIG. 1 is a perspective view of a portable power saw embodying the present invention.

The present invention relates generally to hand held power tools having rotatable tool disks and a movable guard member covering at least a portion of the circular peripheral working surface of the tool disk. For purposes of disclosure and illustration of the invention, the discussion which follows is directed to certain preferred embodiments of the invention, specifically, hand held circular saws comprising an electric motor mounted within a housing of the power tool and having a horizontally extending output shaft on which the circular saw blade is mounted for rotation in a vertical plane. Referring now to FIGS. 1 through 4, a hand held circular saw 10 comprises a motor housing 12 in which an electric motor is disposed. A manipulating handle 18 of the circular saw, situated upwardly and to the rear of the electric motor, is an integral extension of the housing 12. The electric motor has a horizontally extending output shaft 14 on which saw blade 16 is mounted for rotation in a vertical plane (directional references being as viewed in FIG. 1). The saw blade 16, having circular peripheral working surface or edge 17, is mounted to the tool, specifically to the output shaft of the electric motor, in a manner well known to those skilled in the art. In the preferred embodiment illustrated in the drawing, threaded nut 20 is threaded onto shaft 21 to hold ring 22 against the saw blade 16. Handle 18 mounts a trigger 24 which actuates the electric motor to run the circular saw blade 16. Adjustable base or platform 26 is adapted to sit against the surface of the workpiece. Adjustment of the angle of disposition of platform 26 relative cutting blade 16 establishes the angle of the cut to be made in the workpiece.

The circular saw 10 further comprises a fixed-position upper guard member 28. The fixed upper guard member provides an arcuate channel-shaped portion extending in concentrically spaced relation to the periphery of the saw blade. The arcuate channel formed by the fixed upper guard member covers an upper portion of the periphery of the saw blade 16, preferably approximately the top half of the periphery. Movable lower guard member 30 also forms an arcuate channel extending, typically, through about 120 degrees of arc in concentrically spaced relation to the periphery of saw blade 16. Movable guard member 30 is rotatably mounted in a conventional way, having a sector-form inner wall swingabely mounted on a fixed sleeve carried by housing 12 in surrounding relation to the mounting shaft 21. The fixed upper guard member is spaced at greater distance from the saw blade mounting shaft 21 and the arcuate channel thereof is laterally wider than the outside dimension of the lower guard member. Accordingly, in the conventional way, the lower guard member can be rotationally retracted counterclockwise (as viewed in FIG. 1) into the fixed upper guard member 28. Movable lower guard member 30 is biased toward the closed (i.e., unretracted) position in which it covers and protects the lower portion of the saw blade periphery by biasing means, such as a coil spring or other means well known to those skilled in the art. A coil spring may have one end attached to the movable guard member and the other end secured to a fixed portion of housing 12. Lower guard member 30 can be progressively retracted during a cutting operation in the conventional way, i.e., by contact of its leading edge 32 against the workpiece. Alternatively, a transversely extending tab 34 is mounted at the trailing edge 36 of the movable lower guard member 30. Tab 34 can be grasped by hand to manually retract movable lower member 30 into fixed upper guard member 28 against the force of the biasing means.

The circular saw illustrated in the drawings further comprises a guard retainer 40 comprising a retaining latch in the form of a latch plate 42. It will be appreciated from the present disclosure that the retaining latch may alternatively be in the form of a latch pin, etc. suitably mounted and operating in accordance with the principals described below. Retaining latch 42 is mounted on shaft 44 by threaded screw 46. The retaining latch is fixed against rotation relative shaft 44 in any conventional manner, such as by compression, friction fit, splines, etc. Shaft 44 is rotatably mounted by mounting plate 48 fixed to the side surface 50 of fixed upper guard member 28. Shaft 44 also extends rotatably through a journal in handle 18 of the circular saw. Guard retainer 40 further comprises latch operating means for moving the retaining latch into and out of a latching position. Specifically, lever 52 has a first end 53 fixed in a slot in shaft 44 and a second, free end which can be manipulated by the saw operator. Lever 52 extends rearwardly toward trigger 24 in the handle of the circular saw for convenient operation. A second slot 54 is provided in shaft 44 to receive lever 52 on the opposite side of handle 18 so that an operator can select the more convenient position for lever 52. In the position best seen in FIG. 2, the lever is well adapted to thumb operation by a right handed saw operator. The retaining latch extends partially into a slot 56 provided in the upper guard member 28. Specifically, a lower portion of the latch plate forming a radial latch surface 58 extends downwardly into the arcuate channel of the fixed upper guard member 28. Latch surface 58 is adapted to engage the rearward facing stop surface of latch stop 60, an upstanding nub on radially outward surface 62 of movable lower guard member 30.

Retaining latch 42 and shaft 44 are rotationally biased by coil spring 65. The retaining latch is biased toward the unengaged position wherein the movable lower guard member 30 is free to be returned by its biasing means to the closed position. Further, the retaining latch does not lock or otherwise hold itself in the latching position. Coil spring 65 has a free end 66 seated against the outside surface of fixed upper guard member 28. The second end of spring 65 is received in an aperture 67 in the latch plate. Alternative biasing means will be apparent to those skilled in the art.

Figure 3:
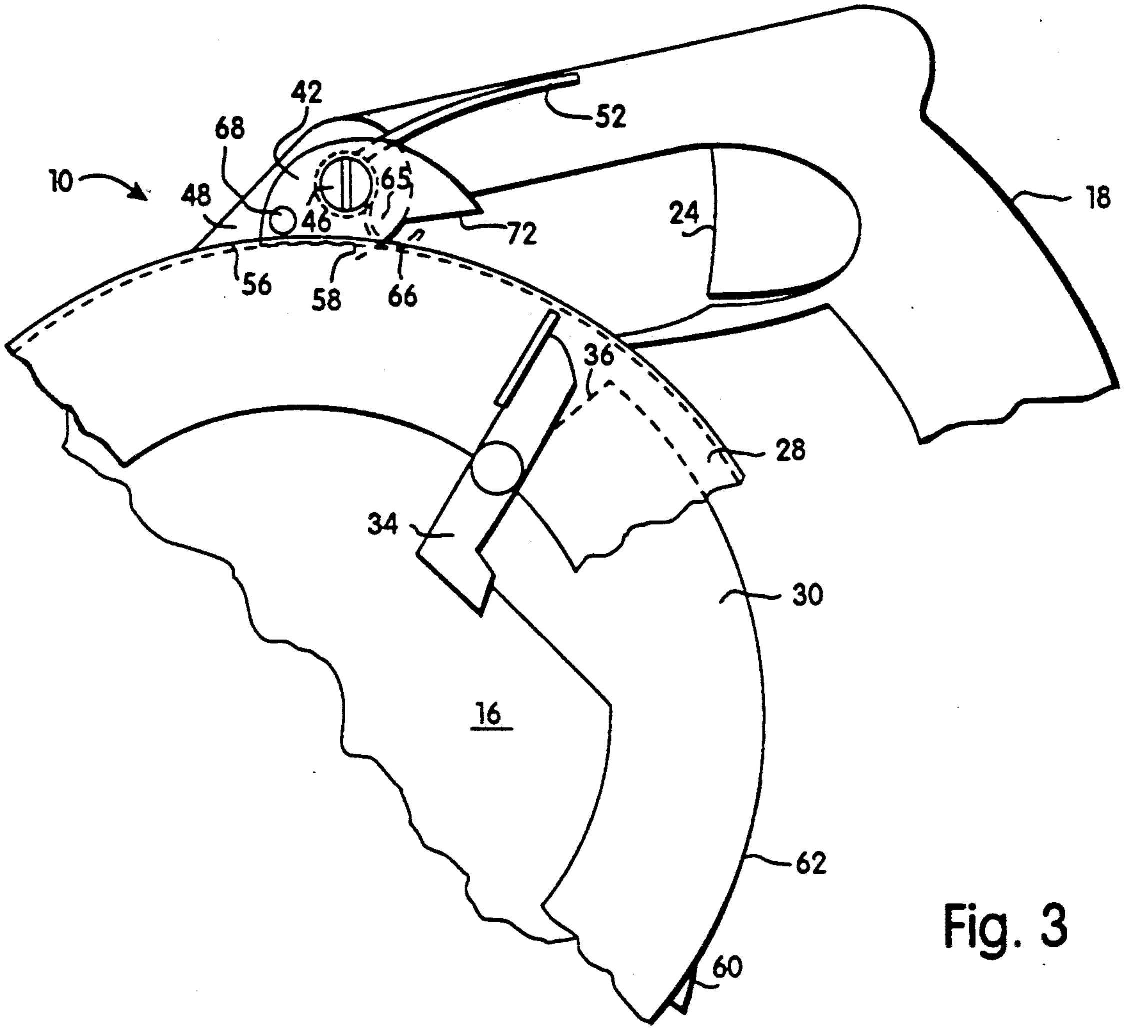
FIG. 3 is an enlarged, partial side elevation of the power saw of FIG. 1, partially broken away, wherein the movable lower guard member is in the closed position.

Referring now specifically to FIG. 3, lower guard member 30 is in its closed position under the influence of its biasing means. The retaining latch 42 is seen in the open or unengaged position, that is, it is rotated counterclockwise under the biasing force of coil spring 65. Counterclockwise rotation is limited by stop means 68 contacting the upper surface of fixed upper guard member 28 at the periphery of slot 56. Stop means 68 can be a rivet, screw or other body fixed to the latch plate, a nub unitary with the latch plate, or any other item which provides a stop surface to engage the surface of the fixed upper guard member. It can be seen that the free end of lever 52 does not extend above the upper surface of handle 18 when the retaining latch is in the unengaged position.

Figure 4:
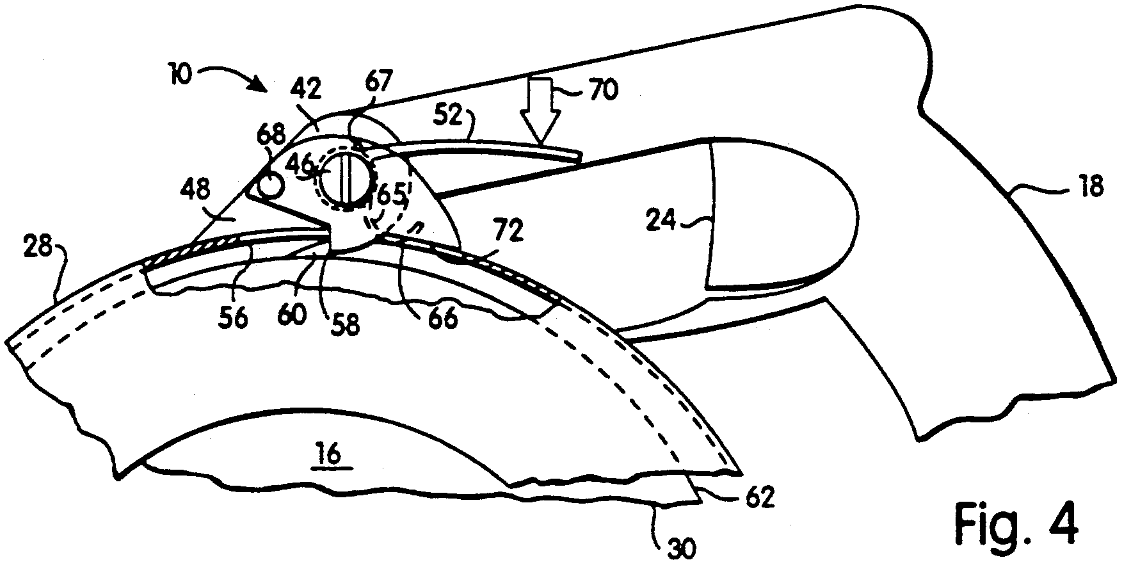
FIG. 4 is an enlarged, partial side elevation and partial section of the power saw of FIG. 1, corresponding to the view of FIG. 3, but showing the movable lower guard member latched in the open position.

Referring now specifically to FIG. 4, the guard retainer is seen in its engaged position. Specifically, under the influence of force represented by arrow 70 against the free end of lever 52, the retaining latch has been rotated clockwise against the biasing force of coil spring 65. Movable lower guard member 30 has been retracted by counterclockwise rotation into the annular channel of upper guard member 28 such that latch stop 60 is behind, and in surface contact with, latch surface 58. The movable lower guard member is held against clockwise rotation by the engagement of latch surface 58 with latch stop 60, which in turn is maintained by force 70 on lever 52. The retaining latch is seen to further comprise a stop surface 72 which prevents clockwise rotation of the latch plate beyond the engaged position. Specifically, clockwise rotation of the latch plate into the engaged position brings stop surface 72 against the outer surface of upper fixed member 30 to prevent further rotation.

A significant advantage of the present invention involves the control afforded the power tool operator over the guard retainer. In the preferred embodiment illustrated, the tool operator can operate with a single hand both the trigger switch to control the electric motor and the latch operating means to hold the movable guard member in the open position. This leaves the operator's second hand free to hold the workpiece, etc. The movable lower guard member is released to return to its closed position when the operator stops applying force 70 against lever 52, regardless whether or not the saw operator releases trigger 24 to stop the electric motor. In addition, it will be appreciated that mere further rotation of the movable lower guard member 30 within the arcuate channel of the upper guard member will not free it to return to its closed position. That is, by maintaining the force 70 against lever 52 the operator can ensure that the movable lower guard member 30 does not return to its closed position even if it is jostled during operation of the power tool. Of course, in the event that the power tool slips from the operator's hands, biasing spring 65 will return the retaining latch to its unengaged position, thereby freeing the movable guard member 30 to return to its covering, protective position around the lower portion of the saw blade.

Figure 2:
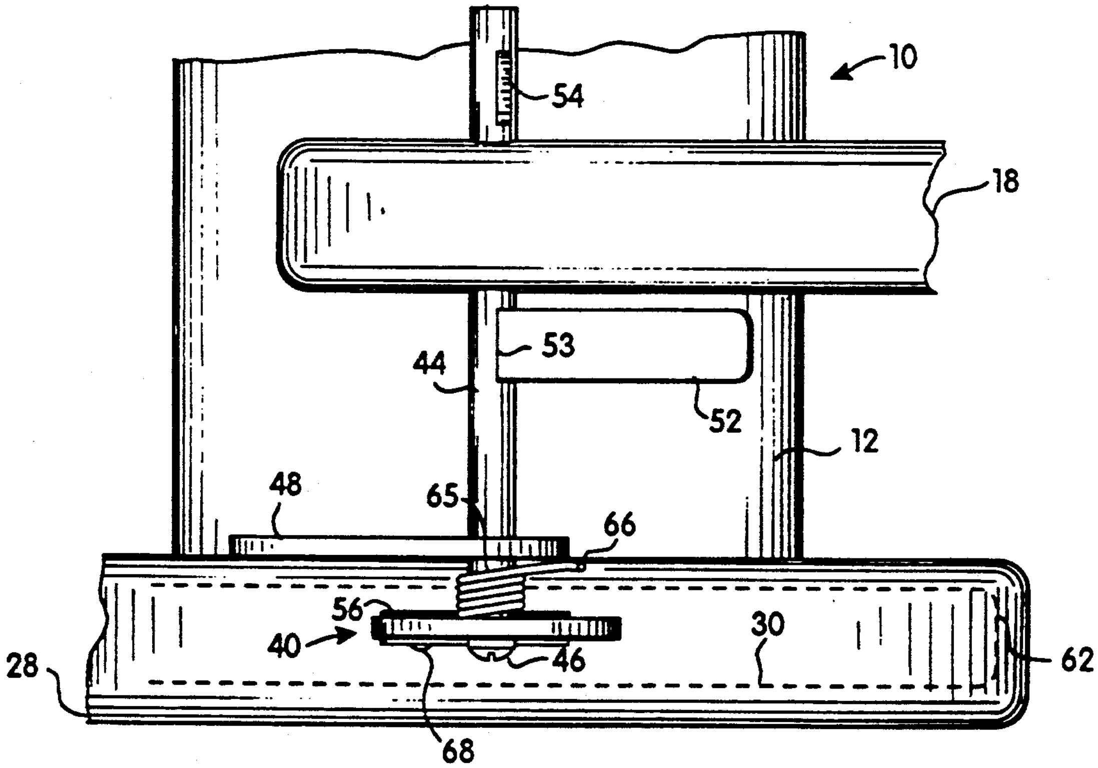
FIG. 2 is an enlarged plan view, partially broken away, of the power saw of FIG. 1.
Figure 5:
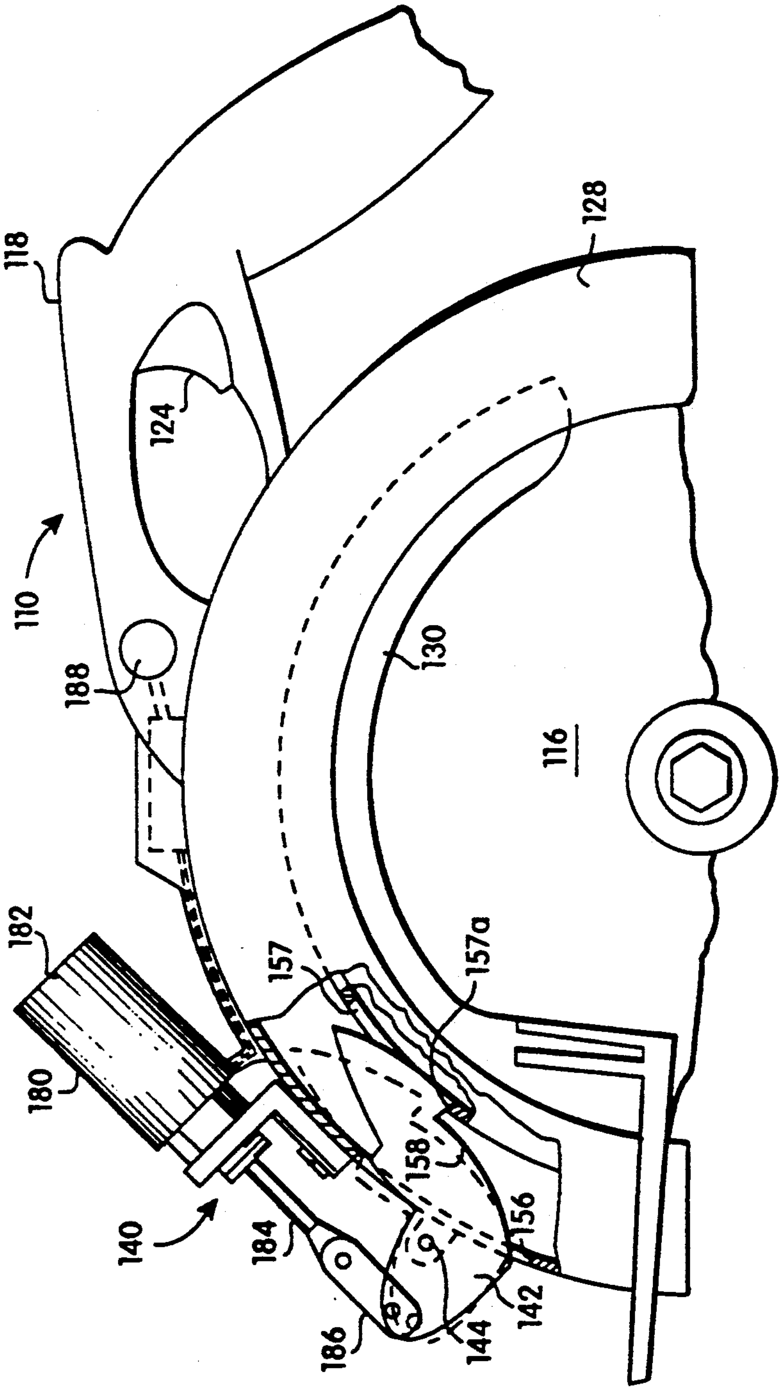
FIG. 5 is an enlarged side elevation, partially in section, illustrating a second preferred embodiment of the invention wherein a switch actuated solenoid operates the retaining latch.

Referring now specifically to FIG. 5, circular saw 110, a second preferred embodiment of the invention, comprises a housing similar to that of the embodiment of FIGS. 1-3. The housing has a handle 118 integral therewith and extending upwardly and rearwardly therefrom. Handle 118 mounts an actuating switch 124 for an electric motor housed within the circular saw housing. Saw blade 116 is rotatably mounted essentially in the manner described above in connection with the embodiment of FIGS. 1-4. A guide plate is adjustably mounted to the circular saw housing for controlling the cutting angle of the saw blade. The circular saw of FIG. 5 differs from the embodiment of FIGS. 1-4 in the details of the guard retainer. In most other respects, including the function and operation of the lower guard member and fixed upper guard member, the two circular saws are the same.

With respect to the guard retainer 140 of the circular saw of FIG. 5, a retaining latch 142 is seen to be mounted for rotation on a pin 144. Specifically, retaining latch 142 rotates clockwise through an aperture 156 in the fixed upper guard member. Pin 144 extends laterally through a mounting bracket 145 on the upper guard member 128. The retaining latch 142 is seen to comprise a latch plate, shown in its latching position. Latch surface 158 of the latch plate extends into aperture 157 in the movable lower guard member 130. It engages a peripheral surface 157*a* of aperture 157 to prevent clockwise rotation of the movable lower guard member 120 to its closed position.

The retaining latch in the embodiment of FIG. 5 is electrically operated. Latch operating means 180 is seen to comprise a solenoid 182 adapted to extend and retract rod 184 which is connected by linkage 186 to the retaining latch 142. The solenoid-type latch operating means of this preferred embodiment is advantageous in requiring essentially only three moving parts: the solenoid, the retaining latch, and the link connecting them. Those skilled in the art will recognize in view of the present disclosure that a rotary solenoid can be used to reduce the latch operating means to a single moving part. A power switch 188 is provided on the handle 118 of the circular saw for convenient operation by the power tool operator. Power switch 188 actuates or energizes the solenoid. Energizing solenoid 182 extends rod 184 to drive retaining latch 142 into the engaged position. Continuous depression of power switch 188 is required to maintain retaining latch 142 in its latching position. The guard retainer, therefore, is biased toward its open, i.e., unengaged position (shown in phantom) and does not lock in the latching position. Coil spring means can be provided, for example, within solenoid 182 to retract rod 184 when the solenoid is not actuated. Alternative biasing means to release latch 142 will be apparent to those skilled in the art in view of the present disclosure.

It will be clear that the movable lower guard member must be retracted to its open position for the retaining latch to enter aperture 157 and thereby hold the lower guard member against clockwise rotation to its closed position. The embodiment of FIGS. 1-4 also requires the movable lower guard member to be in its full open position before the retaining latch can enter the latching position. This is preferred, since it reduces the possibility of the guard retainer being unintentionally engaged. The power tool operator has excellent control over the lower guard member. In the preferred embodiment just described, releasing the power switch would release the retaining latch to return to its disengaged position under the force of its biasing means, thereby freeing the lower guard member to return to its closed, protective position (regardless whether switch 124 was released to de-energize the electric motor of the circular saw). In addition, movement of the lower guard member, due to inadvertent contact with a workpiece etc., would not by itself cause it to be released to return to its closed position.

While certain preferred embodiments of the invention have been illustrated and described above, it will be apparent in view of disclosure that various modifications can be made without departing from the principles and spirit of the invention. All such modifications are intended to be included within the scope of the appended claims.

I claim:

1. A hand held power tool comprising:

a tool disk having a circular peripheral working surface and being mounted to the power tool for rotation in a plane;

a tool guard comprising a movable member biased toward a closed position covering a portion of said working surface and mounted to the power tool for rotation to an open position exposing said portion of the working surface, said tool guard having a latch stop surface; and guard retainer means comprising a retaining latch mounted to the power tool for movement to a latching position to releasably engage said latch stop, for releasably holding the tool guard in the open position, latch biasing means operably connected to the retaining latch for applying biasing force to move the retaining latch out of the latching position, and latch operating means operably linked to the retaining latch for applying force to move the retaining latch to the latching position and to hold it there against the force of the latch biasing means.

2. The hand held power tool of claim 1 wherein said latch operating means comprises a lever having a free end and a second end connected to a rotatable shaft on which the retaining latch is mounted, the free end being movable to rotate the shaft to move the retaining latch to said latching position.

3. The hand held power tool of claim 1 wherein said latch operating means comprises solenoid means for operating an axially movable shaft connected to the retaining latch, the shaft being movable by actuation of the solenoid to a first position to move the retaining latch to the latching position, and further comprises a power switch for actuating the solenoid.

4. The hand held power tool of claim 3 wherein said biasing means comprises shaft biasing means for biasing the shaft toward a second position to move the retaining latch out of the latching position.

5. The hand held power tool of claim 4 wherein the power switch is biased to an off position.

6. The hand held power tool of claim 1 wherein the tool guard further comprises a fixed member covering a further portion of the working surface, the movable member in its open position being located between the fixed member and the tool disk, and the movement of the retaining latch being at least partially through an aperture in the fixed member.

7. The hand held power tool of claim 6 wherein the retaining latch comprises a stop surface which engages a surface of the fixed member to limit movement of the retaining latch beyond its latching position.

8. The hand held power tool of claim 1 wherein the latch stop surface is a surface of a nub upstanding on a radially outward surface of the movable member.

9. The hand held power tool of claim 1 wherein the latch stop surface is a portion of a peripheral surface defining an aperture in the movable member.

10. An electrically powered circular saw adapted to be held by an operator comprising:

an electric motor within a housing;

a handle extending from the housing;

a switch mounted at the handle for actuating the electric motor;

a cutting blade having a circular periphery forming a cutting edge, the cutting blade being mounted on an output shaft of the electric motor for rotation in a cutting plane;

a generally circular blade guard comprising an upper guard member forming an arcuate channel covering a first portion of the periphery of the cutting blade and being mounted to the housing in fixed position, and a lower guard member forming an arcuate channel covering a second portion of the periphery of the cutting blade in a closed position, being mounted for rotation in the cutting plane to an open position at least partially within the arcuate channel of the upper guard member, and being biased toward the closed position; and a guard retainer comprising a retaining latch forming a latch surface and being mounted for movement into and out of a latching position in which the latch surface engages a latch stop of the lower guard member to releasably hold the lower guard member in its open position, biasing means for biasing the retaining latch out of its latching position, and operator controlled latch operating means for moving the retaining latch into the latching position and for holding it in the latching position under ongoing force applied by the operator against force applied by the biasing means.

11. The electrically powered circular saw of claim 10 wherein the latch stop is a radially outwardly extending nub on the lower guard member.

12. The electrically powered circular saw of claim 10 wherein the latch stop is a peripheral surface of a slot in the lower guard member, the retaining latch extending into the slot in its latching position.

13. The electrically powered circular saw of claim 10 wherein said retaining latch is mounted on a latch shaft mounted to the housing, the retaining latch engages the lower guard member in the latching position through an aperture in the upper guard member, and the biasing means comprises a coil spring wrapped about the latch shaft, a first end of the coil spring being seated against the upper guard member and a second end being fixed to the retaining latch.

14. The electrically powered circular saw of claim 13 wherein the latch operating means comprises a lever extending from said latch shaft toward the switch.

15. The electrically powered circular saw of claim wherein the retaining latch further comprises a stop surface which engages an exterior surface of the upper guard member proximate the aperture to limit movement of the retaining latch beyond the latching position.

16. A hand held, electrically powered circular saw comprising:

a housing;

an electric motor mounted within the housing and having a horizontally extending rotatable output shaft;

a handle integral with the housing and extending upwardly and rearwardly therefrom;

a switch for actuating the electric motor mounted on the handle;

a cutting blade having a circular periphery and being mounted for rotation in a vertical plane on the electric motor output shaft;

a generally circular blade guard comprising an upper guard member mounted to the housing in fixed position and having an arcuate channel-shaped portion covering an upper portion of the periphery of the cutting blade, extending substantially concentrically therewith, and a lower guard member having an arcuate channel-shaped portion biased toward a closed position covering a lower portion of the periphery of the cutting blade and being mounted for rotation substantially concentrically with the cutting blade to an open position substantially within the arcuate channel-shaped portion of the upper guard member; and a guard retainer comprising a latch plate mounted in a vertical plane on a horizontal latch shaft for rotation therewith to an engaged position, for holding the lower guard member in its open position, from a disengaged position in which the lower guard member is not held in the open position, the latch shaft being rotatably mounted through a mounting plate affixed to the upper guard member, a lower portion of the latch plate extending through an aperture in the upper guard member and forming a latching surface, the latch plate having a stop surface to engage the upper guard member adjacent the aperture therethrough to prevent rotation of the latch plate beyond the latching position, a coil spring wrapped about the latch shaft biasing the latch shaft and latch plate for rotation out of the latching position, and a latch lever having one end attached to the latch shaft and a free second end extending toward the switch, the free second end being downwardly movable by latching force applied by an operator of the circular saw against the biasing force of the coil spring to rotate the latch plate to its latching position in which the latching surface engages a latch stop integral with the lower guard member, continued application of latching force being required to hold the latch plate in the latching position to prevent rotation of the lower guard member to its closed position.

* * * * *